UNITED STATES PATENT OFFICE.

EMIL MÜLLER, OF BASEL, SWITZERLAND, ASSIGNOR TO THE HOFFMANN-LA ROCHE CHEMICAL WORKS, OF NEW YORK, N. Y., A CORPORATION OF NEW YORK.

PROCESS OF SYNTHETICALLY PRODUCING TROPIC ACID.

1,305,301. Specification of Letters Patent. Patented June 3, 1919.

No Drawing. Application filed December 16, 1916. Serial No. 137,299.

*To all whom it may concern:*

Be it known that I, EMIL MÜLLER, a citizen of Switzerland, and a resident of Basel, Switzerland, have invented certain new and useful Improvements in Processes of Synthetically Producing Tropic Acid, of which the following is a specification.

My invention relates to the synthetic production of tropic acid. Heretofore tropic acid ($C_9H_{10}O_3$) has been produced by treatment of atropin with baryta water. Tropic acid has, however, never been synthetically produced. The object of my invention is to produce tropic acid by a simple and comparatively inexpensive synthesis and to dispense with the variable, poisonous and difficultly procurable substances heretofore largely used in its manufacture.

My invention is characterized by the fact that I first treat the acetic acid ester of oxymethylenephenyl (*Annalen der Chemie*, vol. 291, 1896, p. 147 *et seq.*) with a reducing substance and then produce tropic acid by saponification of the tropic acid ester thus obtained. This production of tropic acid, as a result of the reaction, was not to be expected, since by the reduction of similar compounds, for instance by the treatment of the ester of oxymethylene aceto acetic acid with hydrogen in the presence of palladium chlorid ($PdCl_2$), methyl aceto-acetic acid ester is produced (Meyer Jacobson, II edition, 1913, vol. 1, part 2, page 1238, fourth paragraph from the top.) Accordingly the acetic acid ester of oxymethylenephenyl should, by a reduction analogous to the reduction of oxymethyl aceto-acetic acid ester, produce phenylacetic acid and not phenyl hydracrylic acid ($C_9H_{10}O_3$) *i. e.* tropic acid.

Tropic acid produced by the foregoing process is optically inactive. It melts at 117°–118° C. and corresponds to the tropic acid produced from atropin. The melting point of a mixture of synthetic tropic acid with inactive tropic acid produced from atropin is found to be 117° C. Synthetic tropic acid is useful as a pharmaceutical article similar to the acid heretofore produced from atropin.

*Example 1.*

Five parts of oxymethylenephenylacetic acid ethyl ester are dissolved in eight parts of ether from which substantially all moisture has been removed. An excess of activated aluminum—that is, an aluminum amalgam produced, for example, by treating aluminum chips from which the oil has been removed with sodium hydroxid until hydrogen gas is developed, then washing with water, treating with a solution of 1% of corrosive mercuric chlorid and finally rinsing with water, alcohol and ether—is then added to the solution; drops of water are further added with the result that the reaction is initiated. The temperature and the addition of water are preferably so regulated that the ether is just gently boiling. After about four hours the oxymethylenephenylacetic acid ethyl ester no longer reacts with iron chlorid. The reaction mixture is then filtered and in order to extract the remaining parts of the reaction product from the aluminum hydroxid produced it is boiled down with ether. The evaporation of the ether solution leaves an oily sediment, which does not react with iron chlorid. The sedimentary oil is then saponified by the addition of water and barium hydroxid, at a temperature of about 60° C. Shiny crystals separate from the mixture. The saponification above described is carried on until all the oil disappears. The mixture is then acidified with diluted hydrochloric acid, shapen with ether and the ether evaporated. The remaining crystals are now washed with benzol, dried and the water of crystallization driven off. The melting point of the product is 117°–118° C.

When I speak in my claims of the reduction of oxymethylenephenylacetic acid alkyl ester I do not mean to include any reducing means which are not suitable.

It is to be understood that I do not limit myself to precise details set forth but variations may be employed without departing from the spirit and scope of the invention as set forth in the appended claims.

I claim:

1. In the method of making tropic acid synthetically, the steps which consist in treating an oxymethylenephenylacetic acid alkyl ester with a reducing substance whereby a tropic acid ester is produced and then reacting with a saponifying agent upon such tropic acid ester under such conditions that the latter is converted into tropic acid.

2. In the method of making tropic acid synthetically, the steps which consist in treating oxymethylenephenyl acetic acid ethyl ester with a reducing substance whereby a tropic acid ester is produced and then reacting with a saponifying agent upon such tropic acid ester under such conditions that the latter is converted into tropic acid.

3. In the method of making tropic acid synthetically, the steps which consist in treating oxymethylenephenylacetic acid ethyl ester with an excess of activated aluminum whereby a tropic acid ester is produced and then adding barium hydroxid to the tropic acid ester so produced and heating the mixture so produced whereby the tropic acid ester is converted into tropic acid.

In testimony whereof I have hereunto set my hand.

EMIL MÜLLER.